(12) United States Patent
Carroll et al.

(10) Patent No.: US 10,574,114 B2
(45) Date of Patent: Feb. 25, 2020

(54) ELECTRIC MOTOR FOR USE IN PRESSURIZED FLUID ENVIRONMENT

(71) Applicant: MOOG INC., Elma, NY (US)

(72) Inventors: Matthew Allen Carroll, Christiansburg, VA (US); Lee L. Snider, Christiansburg, VA (US); Mohammad Khandan-Barani, Radford, VA (US); Ronald G. Flanary, Blacksburg, VA (US); Allen Duncan, Radford, VA (US); Travis S. King, Pulaski, VA (US)

(73) Assignee: Moog Inc., Elma, NY (US)

( * ) Notice: Subject to any disclaimer, the term of this patent is extended or adjusted under 35 U.S.C. 154(b) by 182 days.

(21) Appl. No.: 15/584,505

(22) Filed: May 2, 2017

(65) Prior Publication Data
US 2018/0323674 A1    Nov. 8, 2018

(51) Int. Cl.
| | | |
|---|---|---|
| *H02K 5/08* | (2006.01) | |
| *H02K 5/10* | (2006.01) | |
| *H02K 5/128* | (2006.01) | |
| *H02K 5/22* | (2006.01) | |
| *H02K 5/06* | (2006.01) | |
| *H01R 4/242* | (2018.01) | |

(52) U.S. Cl.
CPC .............. *H02K 5/10* (2013.01); *H02K 5/128* (2013.01); *H02K 5/225* (2013.01); *H01R 4/242* (2013.01); *H02K 5/06* (2013.01); *H02K 2005/1287* (2013.01); *H02K 2213/03* (2013.01)

(58) Field of Classification Search
CPC .. H02K 5/08; H02K 5/10; H02K 5/06; H02K 5/128; H02K 5/124; H02K 2213/03
See application file for complete search history.

(56) References Cited

U.S. PATENT DOCUMENTS

| | | | | |
|---|---|---|---|---|
| 2,944,297 A | * | 7/1960 | Maynard ................. | B29C 70/58 174/528 |
| 3,256,829 A | * | 6/1966 | Schneider ............. | F04D 13/064 417/368 |
| 4,387,313 A | * | 6/1983 | Yamamoto ............. | H02K 17/30 310/71 |
| 4,456,844 A | * | 6/1984 | Yamamoto ............. | H02K 11/26 310/43 |
| 4,496,866 A | * | 1/1985 | Yamamoto ........... | H02K 5/1285 310/43 |
| 4,549,105 A | * | 10/1985 | Yamamoto ......... | B22D 11/0401 310/87 |
| 4,585,966 A | * | 4/1986 | Nishida ................ | H02K 5/1285 277/630 |

(Continued)

FOREIGN PATENT DOCUMENTS

DE             9100515 U1    4/1991

*Primary Examiner* — Dang D Le
(74) *Attorney, Agent, or Firm* — Hodgson Russ LLP

(57) ABSTRACT

An electric motor built for exposure to high pressure fluid includes a unitary metal sleeve that provides a fluid barrier between the rotor and the stator. An overmolded resin encapsulates the stator windings and reinforces the sleeve to minimize deformation of the sleeve under high fluid pressures. The overmolded resin also fixes the positions of insulation displacement connectors connected to the stator windings, thereby avoiding mechanical brackets and fasteners for holding the insulation displacement connectors in position.

6 Claims, 6 Drawing Sheets

(56) References Cited

U.S. PATENT DOCUMENTS

| | | | |
|---|---|---|---|
| 5,532,533 A * | 7/1996 | Mizutani | H02K 5/161 310/68 B |
| 6,274,962 B1 | 8/2001 | Kliman | |
| 6,359,353 B1 * | 3/2002 | Bevington | H02K 5/132 310/43 |
| 6,861,777 B2 | 3/2005 | Kimberlin et al. | |
| 7,009,316 B2 * | 3/2006 | Ueda | H02K 3/50 310/43 |
| 8,979,504 B2 | 3/2015 | Snider et al. | |
| 2011/0044831 A1 | 2/2011 | Cunningham et al. | |
| 2011/0234035 A1 | 9/2011 | Wittschier | |
| 2013/0333325 A1 | 12/2013 | Schoenfelder et al. | |
| 2014/0017073 A1 | 1/2014 | Muizelaar et al. | |
| 2014/0234142 A1 | 8/2014 | Mischiatti et al. | |
| 2015/0061437 A1 | 3/2015 | Hudec | |

\* cited by examiner

ELECTRIC MOTOR FOR USE IN PRESSURIZED FLUID ENVIRONMENT

FIELD OF THE INVENTION

The present invention relates generally to electric motors, and more particularly to electric motors exposed to high internal fluid pressures.

BACKGROUND OF THE INVENTION

In some applications, it is desirable to expose an internal portion of an electric motor to fluid under high pressure. For example, in the field of shock absorbers, it may be desirable to provide a hydraulic actuator having an electric motor capable of withstanding high fluid pressures up to 1500 PSI (10,342 kPa) at the rotor without leakage of hydraulic fluid into the stator, where the fluid would damage the stator windings, cause the motor to malfunction, and degrade actuator performance by reducing the amount of hydraulic fluid available for operating the actuator.

It is known to protect the stator of an electric motor from fluid damage by encasing the stator in overmolded resin. While this approach is generally effective for applications in which the fluid is at relatively low pressures, it is not suitable for applications involving higher fluid pressures because the porosity of the molded resin cannot be entirely eliminated and leakage may occur. Also, adhesion between the molded resin and an external housing of the motor will degrade over time when the motor is subjected to wide ranges of temperature cycling and pressure cycling. While it is theoretically possible to seal a stator from intrusion of high pressure fluid using only overmolded resin, doing so for high volume production of electric motors is highly impractical and would be very expensive because a porosity-free surface finish and tight dimensional tolerances of the resin must be ensured.

There is a need for an electric motor capable of withstanding high fluid pressures, i.e. pressures up to about 1500 PSI (10,342 kPa), which can be reliably mass-produced at a reasonable cost point.

SUMMARY OF THE INVENTION

The present invention provides an electric motor for use in applications wherein the motor is exposed to high internal fluid pressures. The motor generally comprises a rotor having an axis of rotation, a stator with windings surrounding the rotor, a unitary metal sleeve, a plurality of insulation displacement connectors, and a resin overmold.

The unitary metal sleeve includes a side portion between the rotor and the stator and may include a flange portion extending radially outward from the side portion. The sleeve provides a fluid barrier between the rotor and the stator. The sleeve may also include a closed end portion.

The plurality of insulation displacement connectors are connected to corresponding windings of the stator. The resin overmold encapsulates the stator and a portion of each insulation displacement connector, and the resin overmold engages the side portion and the flange portion of the sleeve. The resin overmold reinforces the sleeve to minimize deformation of the sleeve when the sleeve is subjected to high pressures. The resin overmold also fixes the position of each insulation displacement connector relative to the housing.

The motor may further comprise a unitary metal housing which includes at least one sidewall defining a cylindrical cavity aligned along the axis of rotation of the rotor, wherein the rotor and the stator are received within the cylindrical cavity of the housing. The unitary metal housing may further include an end wall adjacent the at least one side wall, wherein the end wall has a plurality of portals extending therethrough and communicating with the cylindrical cavity, and the plurality of insulation displacement connectors extend through the plurality of portals. The end wall of the housing may also include a recess, and the closed end portion of the sleeve may be arranged to project into the recess in the end wall of the housing.

The motor may also comprise a retainer ring and an elastomeric O-ring arranged to form a fluid tight seal between the region occupied by the rotor and the region occupied by the stator.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
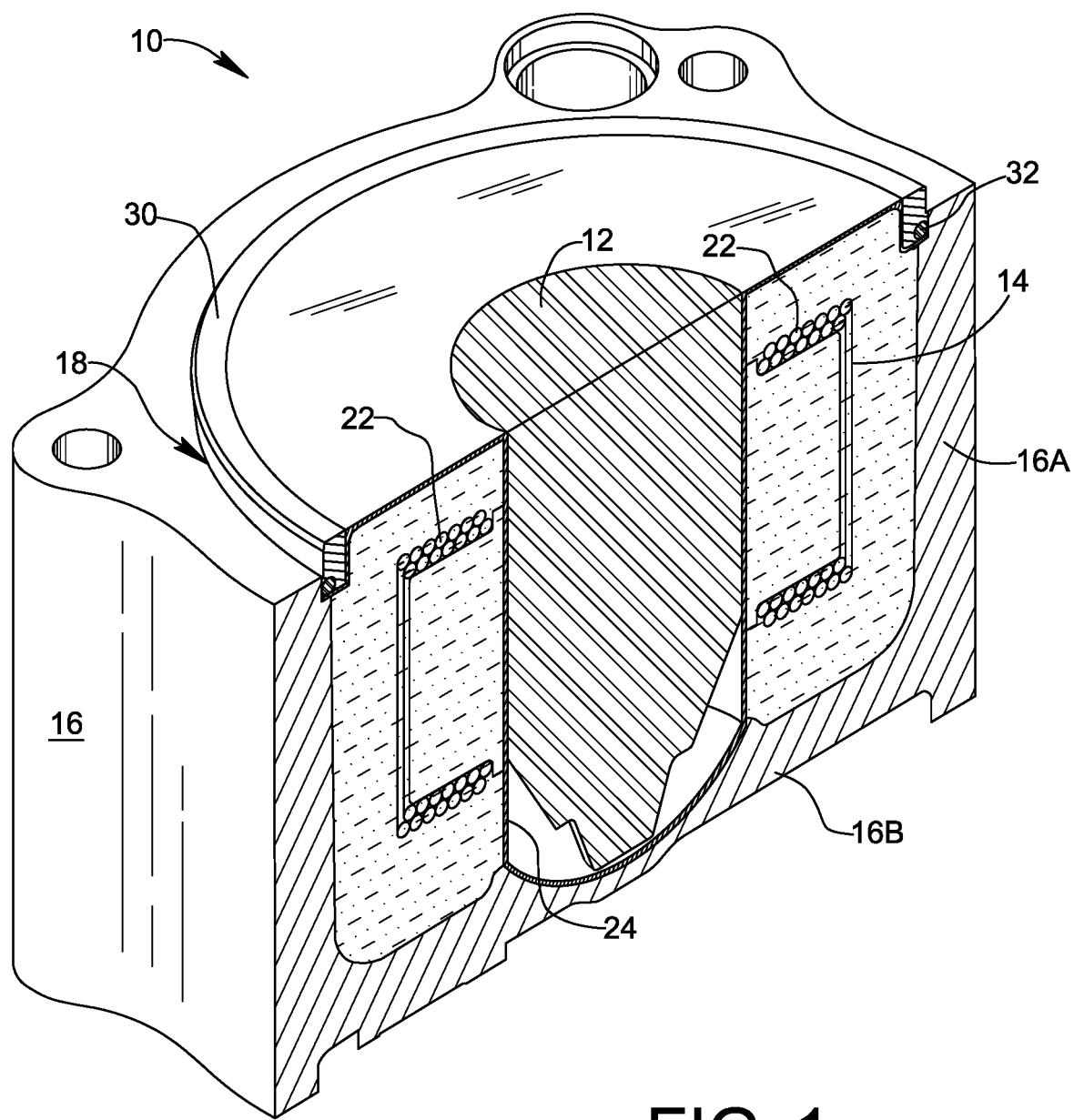
FIG. 1 is a cross-sectioned perspective view illustrating an electric motor formed in accordance with an embodiment of the present invention.
Figure 2:
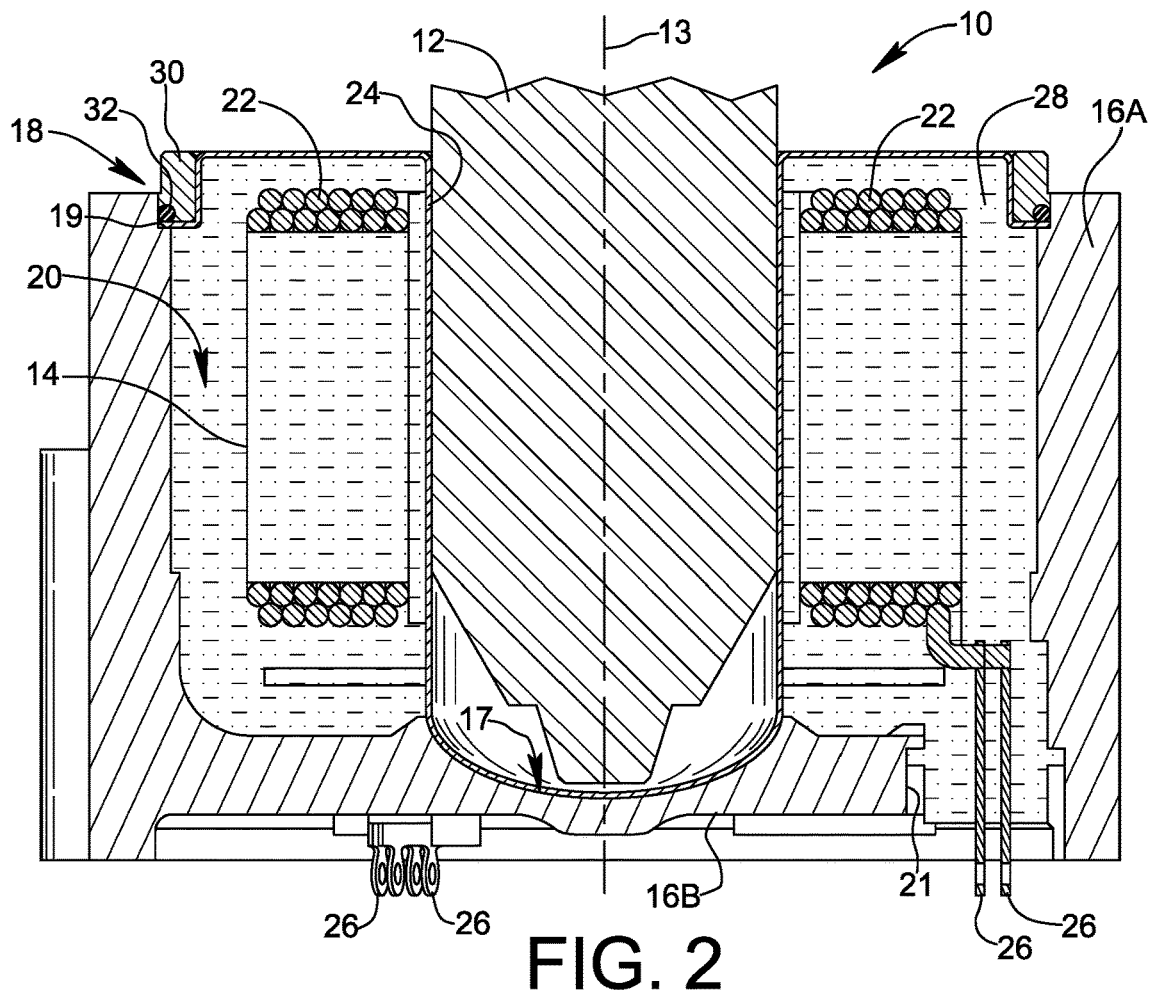
FIG. 2 is detailed cross-sectional view of the electric motor shown in FIG. 1.

Reference is made to FIGS. 1 and 2 showing an electric motor 10 formed in accordance with a first embodiment of the present invention. Motor 10 comprises a rotor 12 which rotates about a rotational axis 13 relative to a surrounding stator 14. As may be seen in FIG. 2, stator 14 includes a plurality of windings 22. Motor 10 may be used in applications wherein rotor 12 is exposed to fluid at high pressures up to about 1500 PSI (10,342 kPa). For example, electric motor 10 may drive a hydraulic actuator wherein rotor 12 is exposed to hydraulic fluid intermittently reaching high fluid pressures up to about 1500 PSI (10,342 kPa). As will be described in detail below, stator 14 is protected from intrusion of pressurized fluid, yet motor 10 is cost-effective to manufacture in quantity and meets applicable performance requirements.

Figure 3:
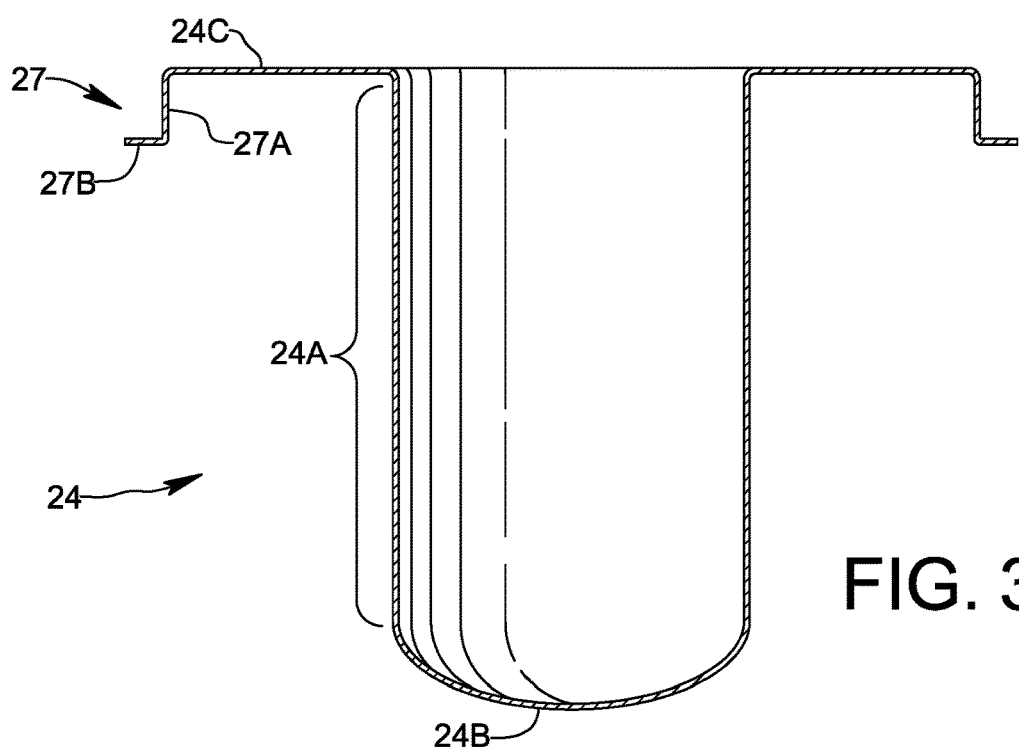
FIG. 3 is a cross-sectional view of a sleeve of the electric motor shown in FIGS. 1 and 2.

In addition to rotor 12 and stator 14, motor 10 further comprises a unitary metal sleeve 24, shown alone in FIG. 3, providing a fluid barrier between rotor 12 and stator 14 for preventing pressurized fluid from leaking into stator 14. As used herein, the term "unitary" means formed entirely from a single piece of material, formed as a single piece molding or casting, or formed as a single piece by additive manufacturing.

Sleeve 24 includes a side portion 24A between rotor 12 and the stator 14, and a flange portion 24C extending radially outward from side portion 24A. In the depicted embodiment, side portion 24A is cylindrical over its entire extent. As shown in FIGS. 1-3, flange portion 24C may include a circumferential stepped rim 27 having an axially extending portion 27A transitioning to a radially extending portion 27B. Sleeve 24 may further include a closed end portion 24B. Alternatively, the end of sleeve 24 opposite flange portion 24C may be open.

Motor 10 also comprises a plurality of insulation displacement connectors 26 connected to corresponding windings 22 of stator 14. For example, motor 10 may have a Wye winding configuration and six insulation displacement connectors 26, one for each of the three phase starts and one for each of the three phase ends.

In addition to the structural elements described above, motor 10 comprises a resin overmold 28 encapsulating stator 14 and a portion of each insulation displacement connector 26. Resin overmold 28 engages the side portion 24A and the flange portion 24C of sleeve 24, thereby stabilizing and reinforcing sleeve 24 against pressurized fluid.

Resin overmold 28 also encapsulates a portion of each insulation displacement connector 26, thereby fixing the position of each insulation displacement connector 26 relative to stator 14. By setting the positions of insulation displacement connector 26 with the resin overmold 28, mechanical fasteners and brackets are avoided, and locational accuracy of the insulation displacement connectors 26 may be precisely controlled at very low cost. As a result, a very economical and reliable connection of stator windings 22 to a printed circuit board (not shown) may be achieved.

Figure 4:
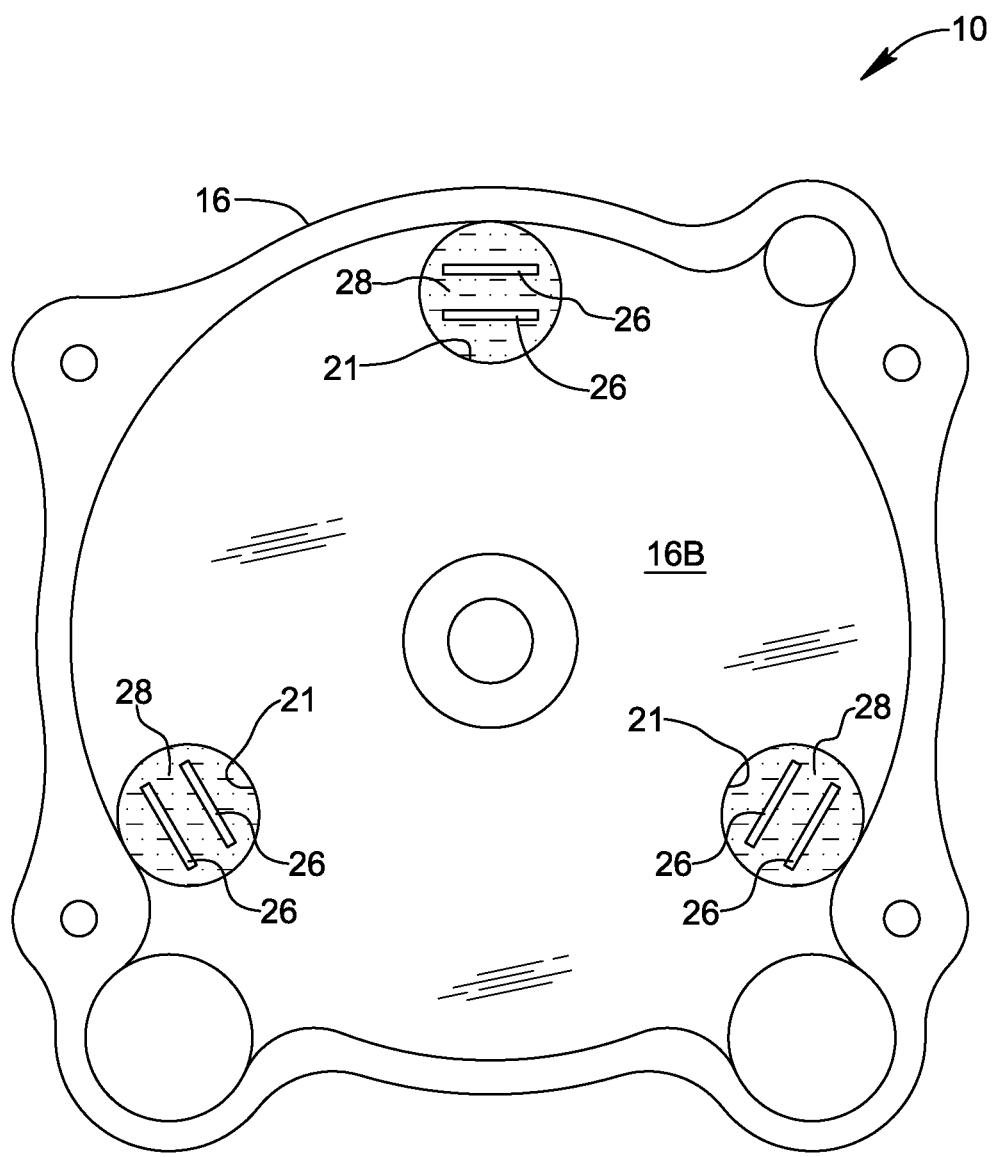
FIG. 4 is a bottom plan view of the electric motor shown in FIGS. 1 and 2 showing portals extending through an end wall of the motor housing.
Figure 5:
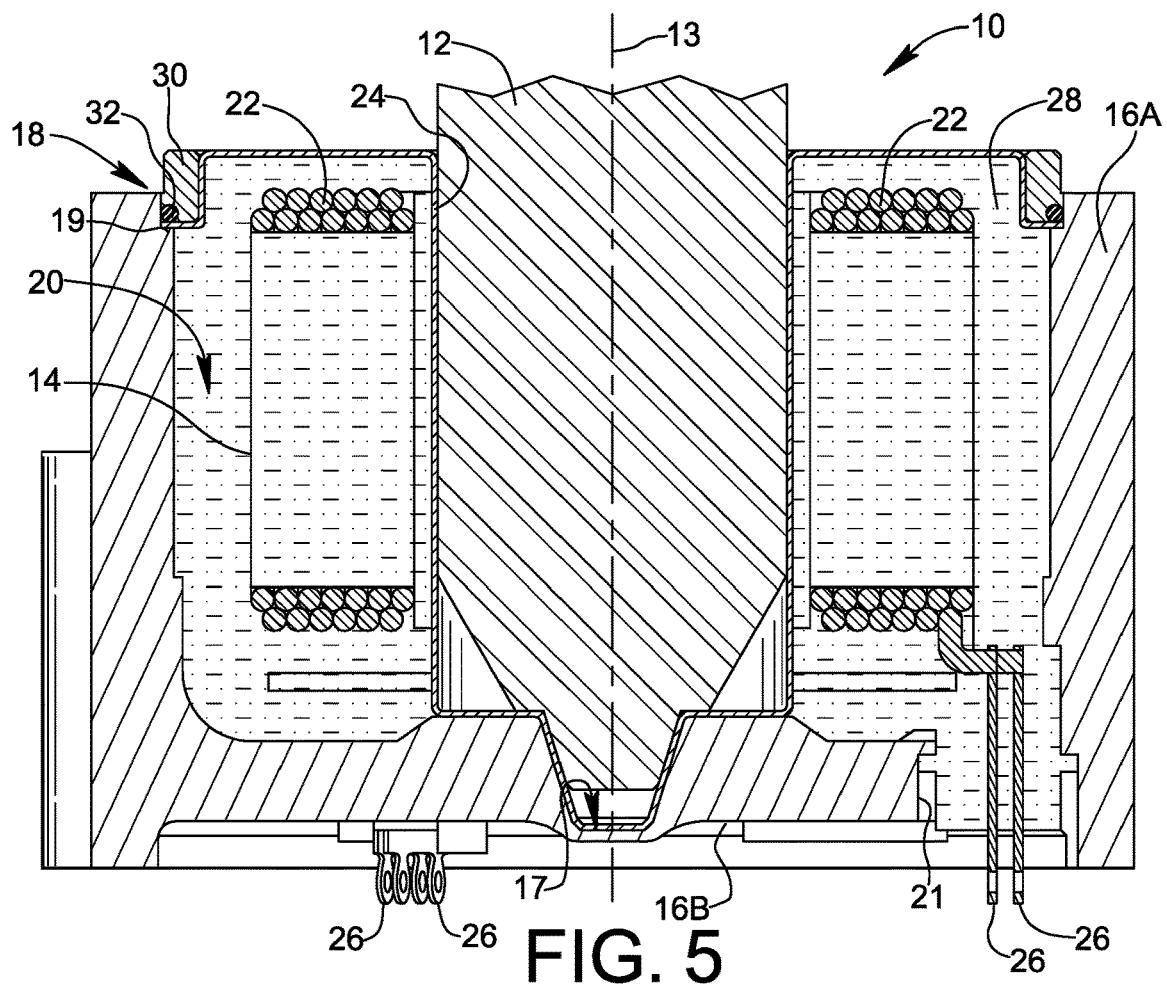
FIG. 5 is a detailed cross-sectional view of an electric motor formed in accordance with another embodiment of the present invention, wherein a sleeve of the electric motor has a different configuration than the sleeve of the electric motor shown in FIGS. 1 and 2.
Figure 6:
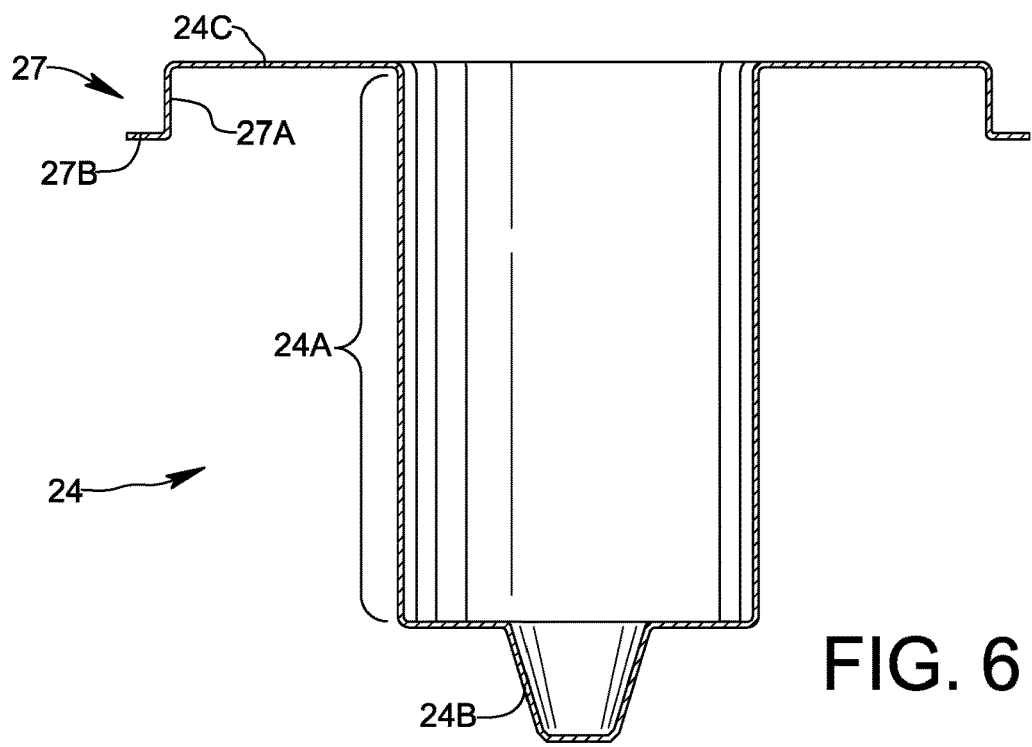
FIG. 6 is a cross-sectional view of the sleeve of the electric motor shown in FIG. 5.

Motor 10 may further comprise a unitary metal housing 16 that includes at least one sidewall 16A surrounding rotor 12 and stator 14. Housing 16 may further include an end wall 16B. As may be seen, the one or more sidewalls 16A and the end wall 16B cooperate to define an open end 18 of housing 16 opposite end wall 16B, and to define a cylindrical cavity 20 aligned along rotational axis 13. End wall 16B has a plurality of portals 21, visible in FIGS. 2 and 4, which extend through the end wall and communicate with cylindrical cavity 20. Housing 16 may further include an internal annular ledge 19 adjacent open end 18. Housing 16 may be made, for example, as a die cast unit formed of aluminum or another suitable metal.

If motor 10 is provided with unitary metal housing 16, the insulation displacement connectors 26 may be arranged to extend through the plurality of portals 21. If sleeve 24 has a closed end portion 24B, the closed end portion 24B may be arranged to engage end wall 16B of housing 16. For example, as shown in FIG. 2, closed end portion 24B may be shaped as convex ellipsoid received in fitted surface-to-surface engagement within a correspondingly-shaped internal recess 17 in end wall 16B of housing 16. Resin overmold 28 may engage inner surfaces of each housing side wall 16A and housing end wall 16B. Resin overmold 28 may also fill space within portals 21 as it encapsulates a portion of each insulation displacement connector 26, thereby fixing the position of each insulation displacement connector 26 relative to both housing 16 and stator 14. Mechanical fasteners and brackets are avoided, and a very economical and reliable connection of stator windings 22 to a printed circuit board (not shown) located outside of housing 16 may be achieved.

FIGS. 5-10 show alternative embodiments wherein the shape of sleeve 24 is altered. In the alternative embodiment shown in FIGS. 5 and 6, the shape of end portion 24B is frusto-conical instead of ellipsoidal, and the shape of recess 17 is altered to correspond to the frusto-conical shape of end portion 24B. The shape of end portion 24B and that of recess 17 is not limited to the shapes depicted in the figures. Other shapes may be adopted for end portion 24B and recess 17, such as a cylindrical shape of reduced radius relative to side portion 24A.

Figure 7:
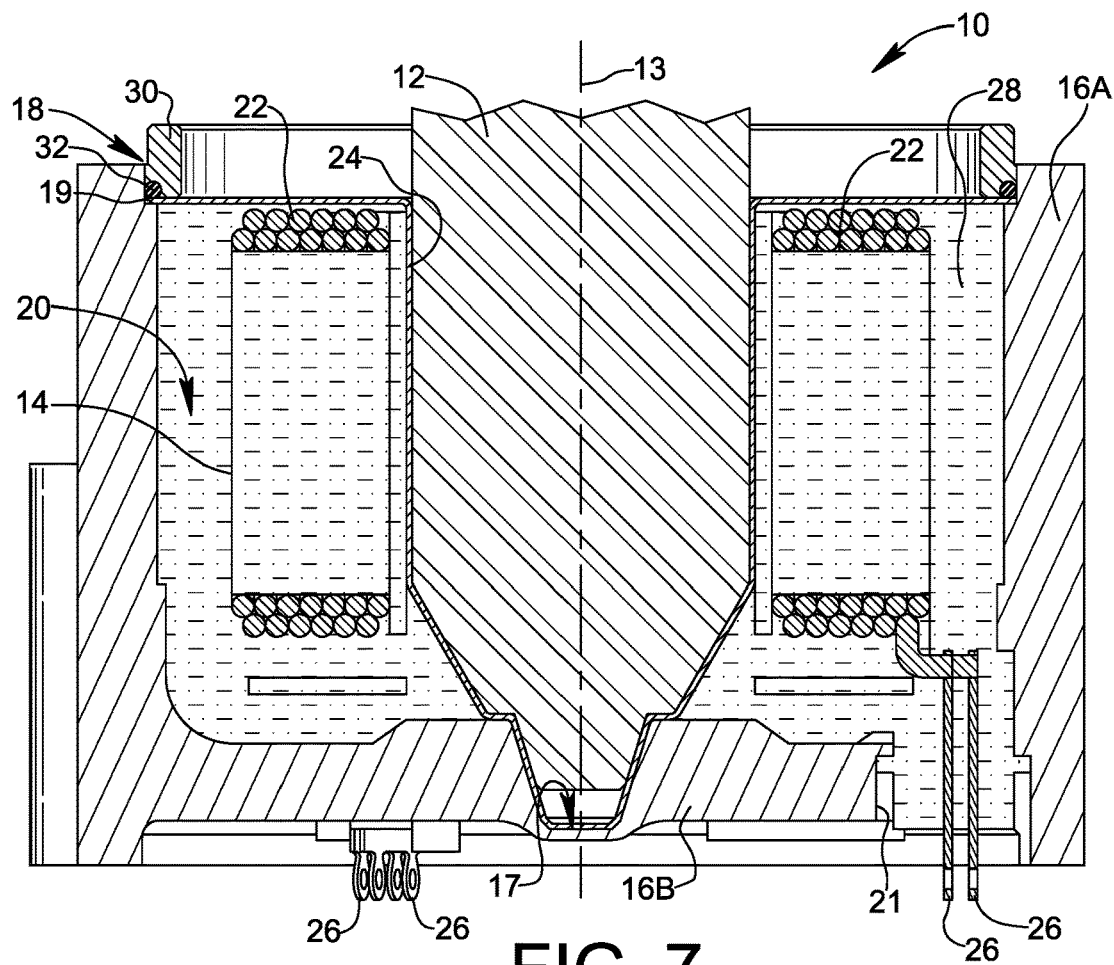
FIG. 7 is a detailed cross-sectional view of an electric motor formed in accordance with a further embodiment of the present invention, wherein a sleeve of the electric motor has a different configuration than the sleeves of the electric motors shown in FIGS. 1, 2, and 5.
Figure 8:
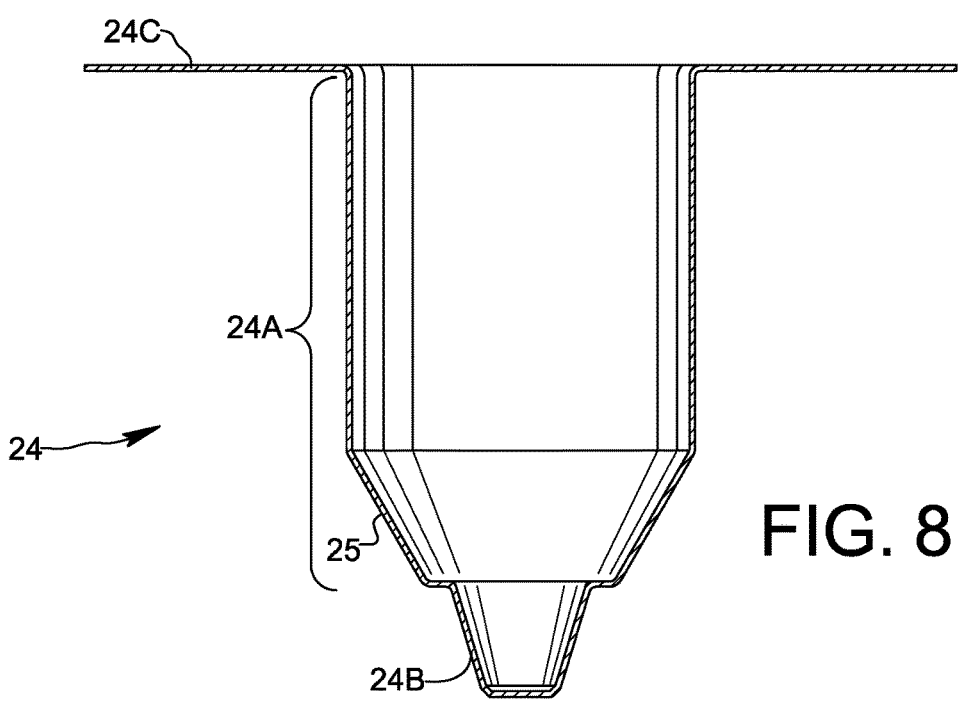
FIG. 8 is a cross-sectional view of the sleeve of the electric motor shown in FIG. 7.

As shown in FIGS. 7 and 8, side portion 24A of sleeve 24 may include a radially reduced portion 25 tapering toward the end portion 24B of the sleeve. For example, side portion 24A may be cylindrical in shape as it proceeds from flange portion 24C, and radially reduced portion 25 may have a frusto-conical shape proceeding from the initial cylindrical portion. A radially reduced portion may be provided in side portion 24A regardless of the shape of end portion 24B. As may be understood, where sleeve 24 includes a radially reduced portion 25 as in FIGS. 7 and 8, the space between stator 12 and sleeve 24 is filled with resin to provide a stabilizing reinforcement for sleeve 24, even though the resin occupying this space is not needed to encapsulate the stator windings 22.

Figure 9:
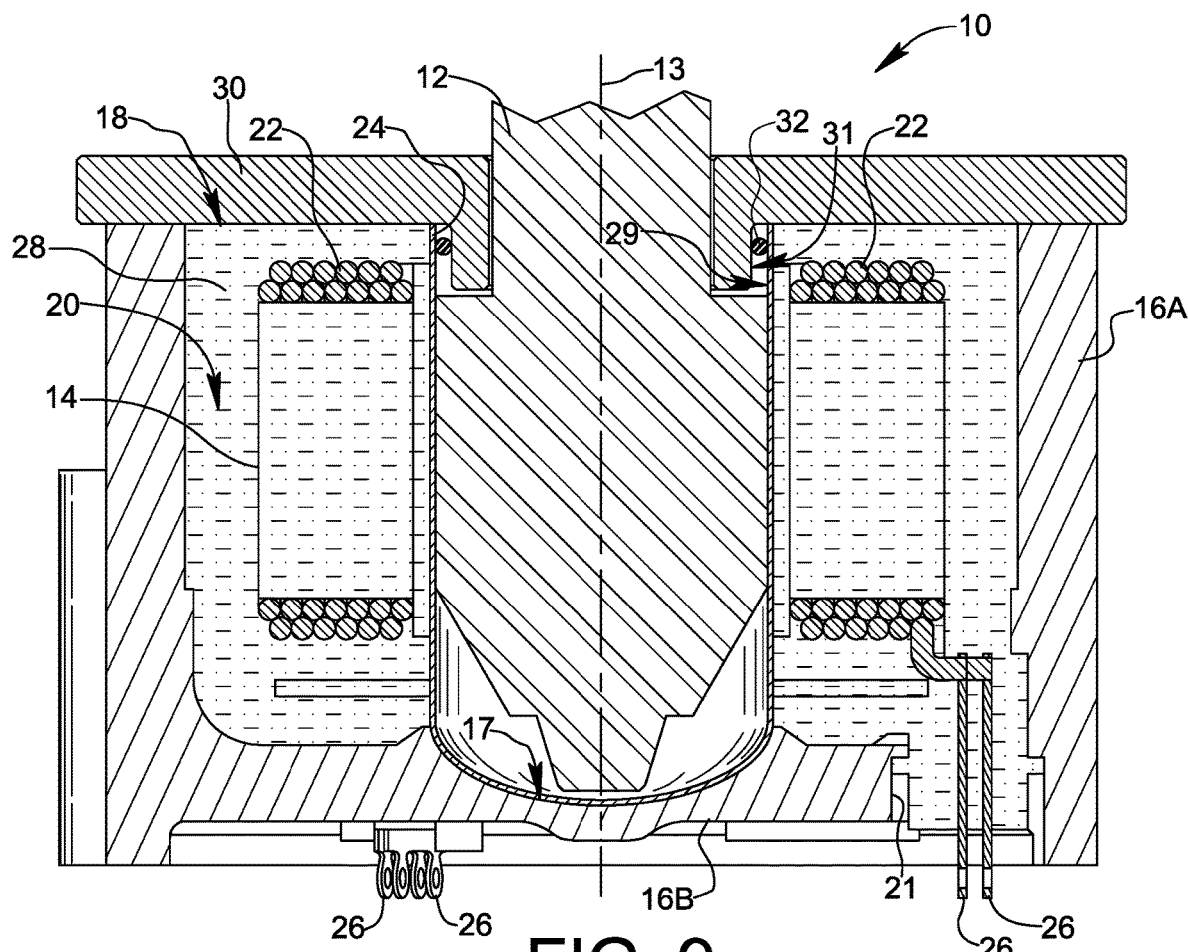
FIG. 9 is a detailed cross-sectional view of an electric motor formed in accordance with a another embodiment of the present invention, wherein a sleeve of the electric motor does not have a radially extending flange portion.
Figure 10:
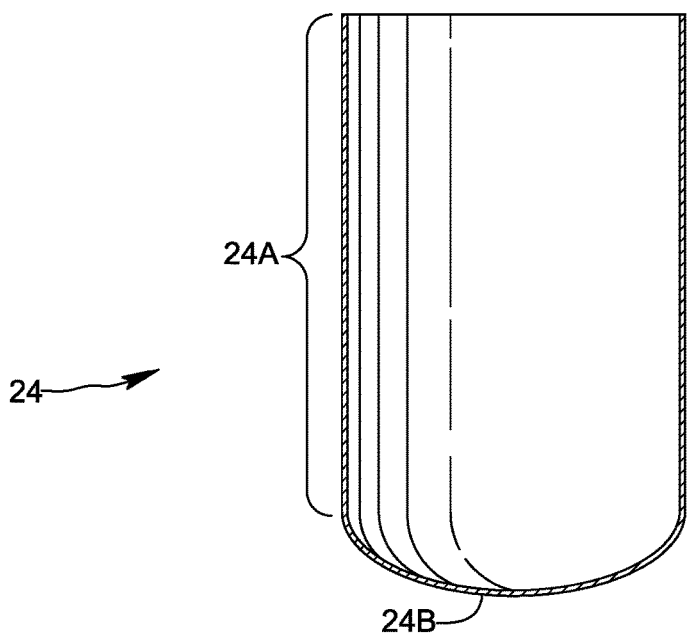
FIG. 10 is a cross-sectional view of the sleeve of the electric motor shown in FIG. 9.

FIGS. 9 and 10 show another embodiment wherein radially extending flange portion 24C is omitted from sleeve 24.

For all embodiments, sleeve 24 may be manufactured from a single thin sheet of metal shaped by a metal drawing process. In this way, tight tolerances may be achieved while avoiding subtractive machining operations and seams in the material. By way of non-limiting example, sleeve 24 may be drawn from a sheet of titanium in a range from 0.010 inches (0.0254 cm) through 0.020 inches (0.0508 cm) in thickness. Burrs and sharp edges may be removed from the drawn sleeve, and the surface finish of the drawn sleeve may be prepared using citric acid passivation pursuant to ASTM A-967-Ole1. Two important considerations in choosing the material for sleeve 24 are mechanical strength and magnetic characteristics. Mechanical strength is important for maintaining shape under high pressure loading. Magnetic characteristics are important for motor performance. The material needs to be nonmagnetic, and should have low eddy currents when exposed to a changing magnetic field.

Electric motor 10 may further comprise a retainer ring 30 and an elastomeric O-ring 32 arranged to form a fluid tight seal between the region occupied by rotor 12 and the region occupied by stator 14.

In the embodiments shown in FIGS. 1-8, retainer ring 30 and elastomeric O-ring 32 are arranged and configured to seal flange portion 24C of sleeve 24 against annular ledge 19 of housing 16. For example, the outer diameter of retainer ring 30 may be sized for interference fit with an inner diameter of housing 16 adjacent ledge 19, and retainer ring 30 may be press-fitted or swaged into housing 16 to engage the peripheral region of flange portion 24C and O-ring 32 to form a strong, fluid-tight seal. As shown in FIGS. 1-6, the axially extending portion 27A of stepped rim 27 may be engaged by an inner diameter of retainer ring 30, and the radially extending portion 27B of stepped rim 27 may be secured by an end face of retainer ring 30 against annular ledge 19 of housing 16. Alternatively, as shown in FIGS. 7-8, flange portion 24C may be a flat, radially enlarged flange whose peripheral edge region is held against annular ledge 19 of housing 16 by an end face of retainer ring 30. The flat configuration of flange portion 24C may be used in the previous embodiments shown in FIGS. 1-6, and the stepped configuration of flange portion 24C may be used in the embodiment of FIGS. 7 and 8.

In the embodiment shown in FIGS. 9 and 10, a portion of retainer ring 30 has an outer diameter 31 facing an inner diameter 29 of the unitary metal sleeve 24, and elastomeric O-ring 32 is arranged between outer diameter 31 and inner diameter 29.

Motor 10 may be assembled by performing the following steps. First, stator 14 is assembled by insulating a stack of laminations, for example by attaching snap-on plastic insulation or overmolding insulation on the stack. The insulated stack is inserted into a winder to apply stator windings 22 to the stack, and the wound stack is rolled into a round shape to form stator 14. Insulation displacement connectors 26 are inserted in pockets in the stack insulation and are attached to corresponding windings 22 to make electrical connections with the windings. As mentioned, a total of six insulation displacement connectors 26 may be provided, one for each phase start and one for each phase end. Any additional wire from the windings 22 that extends beyond the corresponding insulation displacement connector 26. A neutral printed circuit board is installed to connect the three phase ends together to form a neutral for a Wye motor winding configuration. If a separate housing 16 is used, stator 14 is installed into housing 16 by preheating housing 16 and directing the housing onto stator 14 to form a tight mechanical fit. Unitary metal sleeve 24 is then inserted into the central open region of stator 14, and the assembly is overmolded to provide protective and structurally supportive resin overmold 28. The assembly is then ready to accept rotor 12 within sleeve 24.

While the invention has been described in connection with exemplary embodiments, the detailed description is not intended to limit the scope of the invention to the particular forms set forth. The invention is intended to cover such alternatives, modifications and equivalents of the described embodiment as may be included within scope of the claims.

What is claimed is:

1. An electric motor comprising:
a rotor having an axis of rotation;
a stator surrounding the rotor, the stator including a plurality of windings;
a unitary metal sleeve including a side portion between the rotor and the stator, wherein the sleeve provides a fluid barrier between the rotor and the stator;
a plurality of insulation displacement connectors connected to corresponding windings of the stator;
a resin overmold encapsulating the stator and a portion of each insulation displacement connector, wherein the resin overmold engages the side portion of the sleeve, and wherein the resin overmold fixes the position of each insulation displacement connector relative to the stator; and
a unitary metal housing including at least one sidewall defining a cylindrical cavity aligned along the axis of rotation of the rotor, wherein the rotor and the stator are received within the cylindrical cavity of the housing;
wherein another portion of each insulation displacement connector protrudes from the resin overmold;
wherein the unitary metal housing further includes an end wall adjacent the at least one side wall, wherein the end wall has a plurality of portals extending through the end wall and communicating with the cylindrical cavity, and the plurality of insulation displacement connectors extend through the plurality of portals;
wherein the end wall of the housing includes a recess, and the unitary metal sleeve further includes a closed end portion projecting into the recess in the end wall of the housing; and
wherein the end portion of the sleeve and the recess in the end wall of the housing correspond in shape and are in surface-to-surface engagement with one another.

2. The electric motor according to claim 1, wherein the end portion of the sleeve and the recess in the end wall of the housing are ellipsoidal in shape.

3. The electric motor according to claim 1, wherein the end portion of the sleeve and the recess in the end wall of the housing are frusto-conical in shape.

4. An electric motor comprising:
a rotor having an axis of rotation;
a stator surrounding the rotor, the stator including a plurality of windings;
a unitary metal sleeve including a side portion between the rotor and the stator, wherein the sleeve provides a fluid barrier between the rotor and the stator;
a plurality of insulation displacement connectors connected to corresponding windings of the stator;
a resin overmold encapsulating the stator and a portion of each insulation displacement connector, wherein the resin overmold engages the side portion of the sleeve, and wherein the resin overmold fixes the position of each insulation displacement connector relative to the stator; and
a unitary metal housing including at least one sidewall defining a cylindrical cavity aligned along the axis of rotation of the rotor, wherein the rotor and the stator are received within the cylindrical cavity of the housing;
wherein another portion of each insulation displacement connector protrudes from the resin overmold; and
wherein the housing includes an internal annular ledge and the flange portion of the sleeve includes a circumferential stepped rim having an axially extending portion and a radially extending portion, wherein the radially extending portion of the stepped rim engages the annular ledge of the housing, and the electric motor further comprises a retainer ring arranged to retain the radially extending portion of the stepped rim against the annular ledge of the housing and an elastomeric O-ring arranged between the retainer ring and an outer diameter of the axially extending portion of the stepped rim.

5. The electric motor according to claim 4, wherein the housing is a die cast housing.

6. An electric motor comprising:
a rotor having an axis of rotation;
a stator surrounding the rotor, the stator including a plurality of windings;
a unitary metal sleeve including a side portion between the rotor and the stator and a flange portion extending radially outward from the side portion, wherein the unitary metal sleeve provides a fluid barrier between the rotor and the stator; and
a resin overmold encapsulating the stator, wherein the resin overmold engages the side portion of the unitary metal sleeve and the flange portion of the unitary metal sleeve;
a retainer ring and an elastomeric O-ring, the retainer ring having an outer diameter facing an inner diameter of the unitary metal sleeve, the elastomeric O-ring being arranged between the outer diameter of the retainer ring and the inner diameter of the unitary metal sleeve; and a unitary metal housing including at least one sidewall defining a cylindrical cavity aligned along the axis of rotation of the rotor and an end wall adjacent the at least one side wall, wherein the rotor and the stator are received within the cylindrical cavity of the unitary metal housing;

wherein the end wall of the unitary metal housing includes a recess, and the unitary metal sleeve further includes a closed end portion projecting into the recess in the end wall of the unitary metal housing; and wherein the end portion of the unitary metal sleeve and the recess in the end wall of the unitary metal housing correspond in shape and are in surface-to-surface engagement with one another.

* * * * *